United States Patent [19]
Dahlgren

[11] 3,760,530
[45] Sept. 25, 1973

[54] ANIMAL TRAP
[76] Inventor: Wallace L. Dahlgren, 183 Cullen Dr., Winnipeg, Manitoba, Canada
[22] Filed: Sept. 28, 1972
[21] Appl. No.: 292,976

[52] U.S. Cl. .................................................. 43/88
[51] Int. Cl. .......................................... F41c 25/00
[58] Field of Search ...................... 43/88, 58, 60–61, 43/70, 86–87

[56] References Cited
UNITED STATES PATENTS
1,052,181  2/1913  Shaw ....................................... 43/88
1,029,087  6/1912  Scott ....................................... 43/86
1,058,355  4/1913  Ellis ........................................ 43/88

Primary Examiner—Louis G. Mancene
Assistant Examiner—Gregory E. McNeill
Attorney—Stanley G. Ade

[57] ABSTRACT

A pair of semi-circular jaws are pivotally mounted by one end thereof on a base to form substantially a circle when set. A hairpin spring reacts between the jaws and forces the other ends of the jaws in contact with one another when set. A trigger mechanism extends down into the circle defined by the jaws and if this is pivoted in either direction by an animal entering the circle, the ends are displaced thus allowing the jaws to be overlapped with a snapping action thereby trapping the animal therebetween, usually by the neck which is broken by the jaws.

4 Claims, 5 Drawing Figures

PATENTED SEP 25 1973    3,760,530

ANIMAL TRAP

BACKGROUND OF THE INVENTION

Conventional animal traps consist of serrated type jaws which are held open by a spring. When a trigger mechanism is stepped upon by the animal, the jaws snap shut normally trapping the animal by one foot.

It has long been desirable to provide a humane animal trip which will kill the animal in the majority of instances that it has caught in the trap rather than letting it suffer as is the case with present traps.

SUMMARY OF THE INVENTION

This invention relates to new and useful improvements in animal traps whereby the animal is killed in the majority of instances that it enters the trap.

The principal object and essence of the invention is therefore to provide a spring loaded animal trap of the character herewithin described which normally breaks the animal's neck upon being set off.

Yet another object of the invention is to provide a device of the character herewithin described which is adapted to be operated by an animal entering from either side.

A yet further object of the invention is to provide a device of the character herewithin described in which the force of the spring is normally sufficient to kill the animal instantaneously.

A still further object of the invention is to provide a device of the character herewithin described which is set off with the lightest pressure as soon as the animal's head or shoulders enters the circle defined by the jaws.

A still further object of the invention is to provide a device of the character herewithin described which eliminates the use of serrated jaws thus eliminating damage to the skin or hide of the animal caught therebetween.

A still further object of the invention is to provide a device of the character herewithin described which is simple in construction, economical in manufacture and otherwise well suited to the purpose for which it is designed.

With the foregoing objects in view, and other such objects and advantages as will become apparent to those skilled in the art to which this invention relates as this specification proceeds, my invention consists essentially in the arrangement and construction of parts all as hereinafter more particularly described, reference being had to the accompanying drawings in which:

DESCRIPTION OF THE DRAWINGS

In the drawings like characters of reference indicate corresponding parts in the different figures.

PRELIMINARY DESCRIPTION

Figures 1, 2, 3, 4, 5:
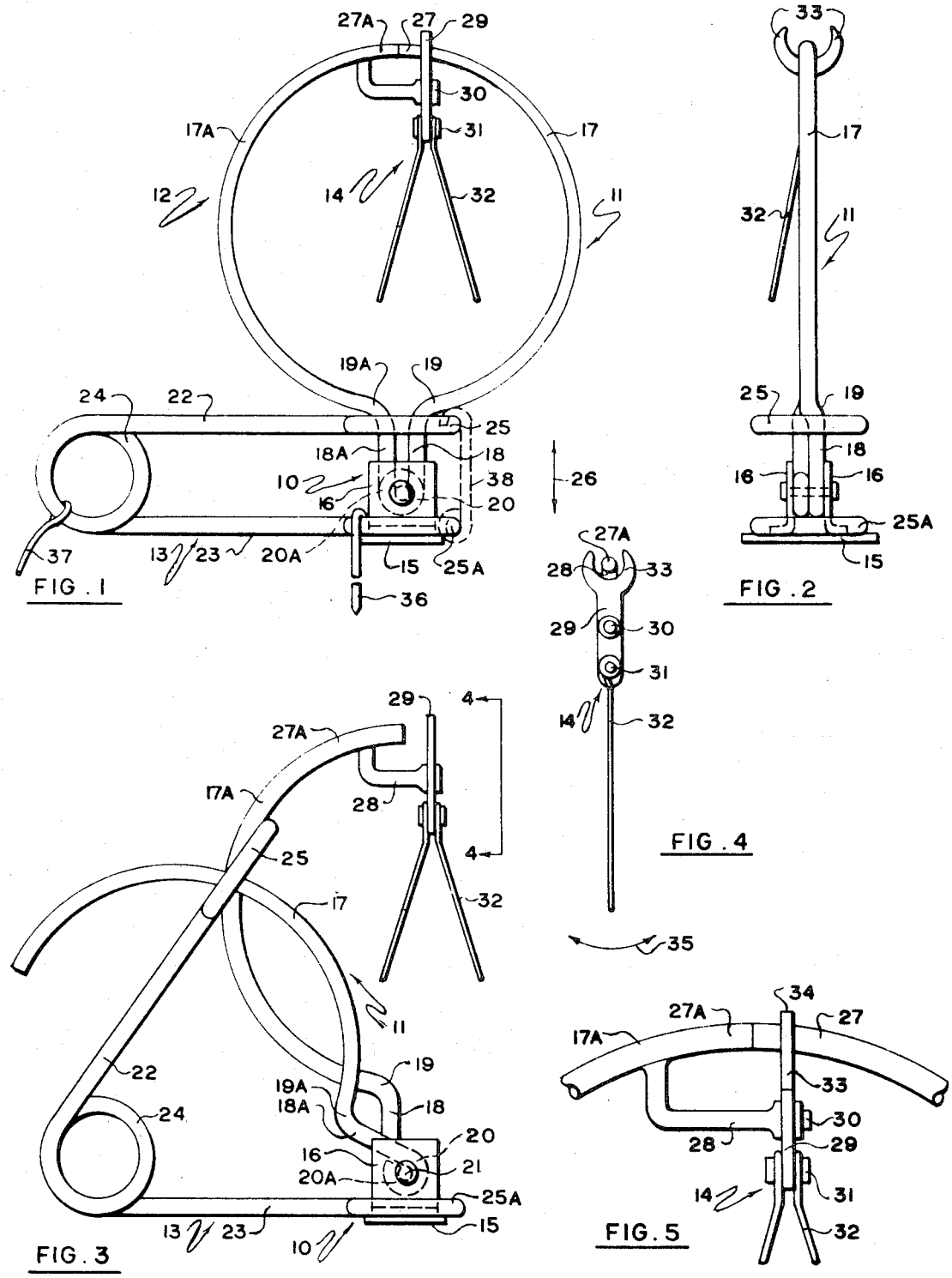
FIG. 1 is a front elevation of the trap in the set position.
FIG. 2 is an end view of FIG. 1.
FIG. 3 is a front elevation of the trap in the sprung position.
FIG. 4 is an enlarged fragmentary view substantially along the line 4—4 of FIG. 3.
FIG. 5 is an enlarged fragmentary front elevation showing the upper end of the trap with the trigger mechanism.

The trap consists of a base 10 and a pair of semi-cylindrical jaws 11 and 12 normally pivoted upon the base and adapted to be engaged in butting relationship one with the other, being held in this position by means of a hairpin spring assembly 13 which forces the ends of the semi-circular jaws in this butting relationship.

A trigger mechanism 14 is easily displaced thus moving the ends of the jaws out of abutting relationship and permitting the hairpin spring to open thereby overlapping the jaws with a snapping action.

DETAILED DESCRIPTION

Proceeding therefore to describe the invention in detail, the base 10 normally consists of a substantially rectangular base plate 15 having a pair of lugs 16 extending upwardly therefrom in spaced and parallel relationship one with the other.

The jaw 11 is preferably manufactured from cylindrical steel rod and includes the semi-cylindrical portion 17 together with a securing portion 18 extending substantially at right angles from one end 19 of the semi-cylindrical portion 17.

The other end of the securing portion is formed in an eye loop shown in phantom by reference character 20 and this pivotally engages a pivot pin 21 extending through the lugs or flanges 16.

The other jaw 12 is formed in a smilar manner inasmuch as it comprises a substantially semi-cylindrical portion 17A with an attaching portion 18A depending from the end 19A in a similar manner and also being provided with an eye loop 20A on the end thereof engageable around pin 21 in a pivoting action so that the two eye loops 20 and 20A lie in side by side relationship as shown in FIG. 2.

Although the term semi-cylindrical has been used to define the portions 17 and 17A of the jaw, nevertheless it will be appreciated that these could be arcuately curved and that they are not necessarily a perfect semi-circle.

The hairpin spring assembly 13 consists of an upper member or arm 22 and a lower member or arm 23 each of which extends from a multiple spring coil which is conventional in construction.

Substantially circular eyes 25 and 25A are formed on the ends of the arms 22 and 23 and the resiliency of the coils 24 normally biasses the arms apart from one another in the direction of double headed arrow 26.

The aforementioned securing portions 18 and 18A form shoulders with the ends 19 and 19A respectively and the upper circular eye 25 of the spring arm 22 normally rests against the shoulders when the trap is in the set position shown in FIG. 1 with the lower circular eye 25A reacting against the base 15.

The other ends 27 and 27A of the jaws are in butting relationship when the trap is set as shown in FIG. 1 with the hairpin spring forcing these ends into this butting relationship due to the engagement of the upper circular eye 25 with the shoulders formed at the junction of the portions 18 and 19 and 18A and 19A as clearly illustrated.

The trigger assembly includes an anchor bar 28 extending downwardly and across the junction between the jaws at the upper ends thereof, said anchor bar lying in the same plane as the jaws as clearly shown.

A U-shaped trigger member 29 is pivoted to the end of the anchor bar 28 by means of pivot pin 30 and a pair of fine wires are rigidly secured to the lower end 31 of the trigger member and extend outwardly and downwardly across the area defined by the portions 17 and 17A of the jaws, said wires lying substantially in the same plane as the jaws.

The arms 33 of the U-shaped member 29 lie upon each side of the upper end 27 of the jaw 11 with the upper extremities 34 just overlapping part of the thickness of the end 27 as shown in FIG. 5.

From the foregoing it will be appreciated that any thing striking the wires 32 from either direction as for example an animal whose head enters the circle defined by the jaws, will pivot the trigger member 29 in either direction as shown by the double headed arrow 35.

As soon as one of the arms 33 strikes the end 27 of the jaw 17, it will displace these ends from the butting relationship thus allowing the hairpin spring to open to the fullest extent as shown in FIG. 3. This has the effect of causing the jaws to overlap one another rapidly with a snapping action so that any animal trapped therebetween normally would be killed instantly without damage occuring to the fur or skin.

An anchor pin is pivoted to the lowermost ring 25A for anchoring the trap to the ground and a tethering wire 37 extends from the spring 24 for attachment to a convenient anchoring source.

Finally a safety hook 38 is shown in phantom in FIG. 1 and may engage the two circular eyes 25 and 25A to hold the spring in the closed position while the trap is being set and installed.

Since various modifications can be made in my invention as hereinabove described, and many apparently widely different embodiments of same made within the spirit and scope of the claims witout departing from such spirit and scope, it is intended that all matter contained in the accompanying specification shall be interpreted as illustrative only and not in a limiting sense.

What is claim as my invention is:

1. An animal trap comprising in combination a supporting base, a pair of semi-circular jaw members each mounted for pivotal action by one end thereof, to said base, and extending upwardly therefrom to lie in a substantially vertical plane when in use, said jaws adapted to form substantially a circle when the other ends of said jaws are in butting relationship one with the other, a heavy duty hairpin spring having jaw engaging means on the end thereof and a trigger mechanism secured to said jaws and being operatively connected therewith, said trigger mechanism including anchor means extending from adjacent the other end of one of said jaws and in the plane of said jaws, a U-shaped trigger member pivotally supported upon said anchor means whereby the arms of said trigger member are situated one upon each side of the other end of the other of said jaws when in the set position and at least one trigger member pivoting wire secured to said trigger member and extending into the area defined by said jaws when in the set position whereby displacement of said wire normal to the plane of the jaws pivot said trigger member and thereby displaces said other ends of said jaws from the butting relationship so that the hairpin spring opens and overlaps said jaws to the sprung position.

2. The trap according to claim 1 in which each of said jaws comprises a semi-circular portion and a securing portion extending substantially at right angles from said one end there-of to define a shoulder at the base of each jaw, said jaw engag-ing means normally surrounding said securing portions when said trap is set and reacting between said shoulders and said base.

3. The trap according to claim 1 in which said jaw engaging means comprises a substantially circular eye formed on the ends of said hairpin spring.

4. The trap according to claim 2 in which said jaw engaging means comprises a substantially circular eye formed on the ends of said hairpin spring.

* * * * *